United States Patent [19]

O'Brien et al.

[11] 4,063,684
[45] Dec. 20, 1977

[54] COMPOSITE ROCKET NOZZLE STRUCTURE

[75] Inventors: John R. O'Brien, Creve Coeur; Harry A. Holman, Jr., Ladue; Albert W. Kallmeyer, Crestwood, all of Mo.

[73] Assignee: The United States of America as represented by the Secretary of the Air Force, Washington, D.C.

[21] Appl. No.: 634,799

[22] Filed: Nov. 25, 1975

[51] Int. Cl.² ............... B63H 11/00; B64D 33/04
[52] U.S. Cl. ............... 239/265.11; 239/DIG. 19; 428/36; 428/102; 428/113; 428/251; 428/257; 428/273; 428/902
[58] Field of Search ............... 239/265.11, DIG. 19; 428/36, 102, 108, 113, 251, 257, 273, 902; 156/148; 139/16, 387 R, 384 R

[56] References Cited

U.S. PATENT DOCUMENTS

| 2,948,950 | 8/1960 | Finger et al. | 428/257 |
| 3,466,210 | 9/1969 | Wareham | 156/148 |
| 3,713,934 | 1/1973 | Morton | 428/257 |
| 3,719,212 | 3/1973 | Emerson et al. | 139/387 R |
| 3,750,714 | 8/1973 | Holman et al. | 139/16 |
| 3,819,461 | 6/1974 | Saffadi | 428/902 |
| 3,853,586 | 12/1974 | Olcott | 239/265.11 |
| 3,875,973 | 4/1975 | Kallmeyer et al. | 139/16 |
| 3,902,944 | 9/1975 | Ashton et al. | 428/36 |
| 4,001,478 | 1/1977 | King | 428/257 |

OTHER PUBLICATIONS

Barton, "A Three Dimensionally Reinforced Material," Society of Plastics Engineers Journal, vol. 24, May 1968, pp. 31-36.

Robbins, "Structural Components Produced by Modified Weaving Techniques", Textile Institute and Industry, Mar. 1970, pp. 71-75.

Emerson, "Modern Developments in Three-Dimensional Fabrics", Modern Textiles, Nov. 1969, pp. 51-54.

Primary Examiner—William R. Dixon, Jr.
Attorney, Agent, or Firm—Joseph E. Rusz; William J. O'Brien

[57] ABSTRACT

A multidimensional woven, resinous impregnated, rocket nozzle structure composed of fibers running along the longitudinal axis of the nozzle and positioned radially in conformance with the general shape of the nozzle with a weaving fiber under tension and running circumferentially and radially normal to the said longitudinal axis to interlock with said longitudinal fibers in at least three directions.

1 Claim, 6 Drawing Figures

COMPOSITE ROCKET NOZZLE STRUCTURE

STATEMENT OF GOVERNMENT INTEREST

The invention described herein may be manufactured and used by or for the Government for governmental purposes without the payment of any royalty thereon.

BACKGROUND OF THE INVENTION

This invention relates to the fabrication of propulsion components and to the resultant structures produced thereby. In a more particular aspect, this invention concerns itself with the fabrication of three-dimensional woven plastic composites for application to rocket nozzles, rocket thrust chambers, integral rocket motors, re-entry heat shields, nose tips, nuclear reactor parts and other structural elements which require a high strength to weight ratio in conjunction with a high temperature capability.

The present interest in high speed and high altitude aircraft, missiles and rockets has created a need for structural elements that are characterized by having the requisite dimensional stability and structural strength to withstand the severe stresses and strains encountered during operation within the high temperature environment of a re-entry regime.

Typically, rocket nozzles, combustion chambers and integral rocket motors are made of composite materials with two-dimensional reinforcing fibers. A number of methods are known for laying the fibers and include a tape wrap and flat wrap in which woven cloth forms are laid perpendicular to the nozzle/motor axis. Another method is the dixie cup wrap in which the cloth forms are canted to the axis. A chopped fabric method, in which the material is randomly put into a mold, compressed and molded into a matrix material is also employed. Conventional filament wound or braided structures have also been used.

However, the structural items made of these materials require a supporting outer steel shell and, in many cases, layers of insulating materials to which they are bonded. This results in an inherent weakness. The bond is always weaker than the fibers and constitutes the basic failure mechanism when heat is applied. "Chunking" describes the failure when chunks of the material come apart at the bond line which is a typical problem of tape wrapped and chopped fabric composites.

Delamination is the typical failure mechanism of cloth braid and filament reinforcements. This results from the fact that the reinforcements are not held together "independent of the bond". The formation of holes cause fraying of the fibers and weakening of the hoop strength in filament wound and braided structures, while the breaking of the edges where chopped fabric is used is still another problem.

The use of a three-dimensional woven fabric has been suggested since blocks of three-dimensional material can be made by pegging, nailing or stitching together many layers of cloth. Bodies of revolution can be machined from these blocks, but this involves serious waste of material and the orientation of the fibers cannot be controlled adequately.

With the present invention, however, it has been found that the aforementioned problems can be overcome by using the polar woven, multidirectional composites of this invention. In fabricating the composites of this invention, longitudinal fibers are arranged, as desired, in up to 360 radial rows around the circumference of a propulsion component, such as a rocket nozzle. Different fibers, such as quartz, carbon, graphite or glass may be arranged from the inside to the outside wall to give the desired characteristics of ablation, insulation or structural integrity. Circumferential fibers are woven into the longitudinals. Different weave patterns may be used, again depending on the desired characteristics.

SUMMARY OF THE INVENTION

In accordance with this invention, it has been discovered that propulsion components, especially rocket nozzles, having structural and dimensional strength coupled with a high degree of resistance to the degradative effects of high temperature can be fabricated from a plastic impregnated, three-dimensional woven material containing high strength fibers such as silica, carbon, graphite or glass. The woven material is prepared in accordance with a pre-determined weaving pattern by laying the fibers on an internal mandrel with all threads inserted under high tension loads. A first series of fibers are layed along the longitudinal axis of the mandrel, and positioned radially in general conformance to the shape of the mandrel. A circumferential fiber is then woven into the longitudinal fibers either manually or by the use of an automated three dimensional loom to weave bodies of revolution. Different weave patterns may be generated as required to optimize performance of the end items. Fiber densities of fifty pounds per cubic foot are attained using carbon thread, and 85 to 95 pounds per cubic foot are obtained using silica threads.

Accordingly, the primary object of this invention is to provide novel components for use in a propulsion type environment.

Another object of this invention is to provide a rocket nozzle structure fabricated from a multidimensional, resin impregnated, woven fabric of high strength fibers.

Still another object of this invention is to provide a rocket nozzle that demonstrates a high degree of structural strength and dimensional stability while operating within a high stress and high tempeature environment.

The above and still other objects advantages and features of the present invention will become more readily apparent upon consideration of the following detailed description thereof when taken in conjunction with the accompanying drawings. In the several views of the drawing, like reference characters indicate the same or similar elements.

DESCRIPTION OF THE PREFERRED EMBODIMENT

Pursuant to the above defined objects, the present invention contemplates the fabrication of propulsion components from a multidemensional woven fabric of high strength fibers such as silica, carbon, graphite or glass. The basic fabrication approach is to lay a series of fibers along the longitudinal axis of a preformed, internal mandrel in radial relationship. A weaving fiber is then woven circumferantially and radially in a predetermined weaving pattern along the longitudinal axis of the mandrel. After completing the weaving of the circumferential fibers, the resultant woven material is impregnated with a conventional thermosetting, resinous impregnant, such as Monsanto Chemical Company, SC1008 phenolic resin, and then cured in accordance with conventional impregnating and curing techniques. The weaving step may be accomplished manually, or by using an automated three-dimensional loom to weave bodies of revolution. A variety of weaving patterns can be used depending upon the particular characteristics desired in the resulting end product.

One of the typical weaving patterns is called angle interlock while another is referred to as full depth interlock. Both patterns may be woven homogeneously from inside diameter to outside diameter, and in two or three integrated layers.

Figure 1:
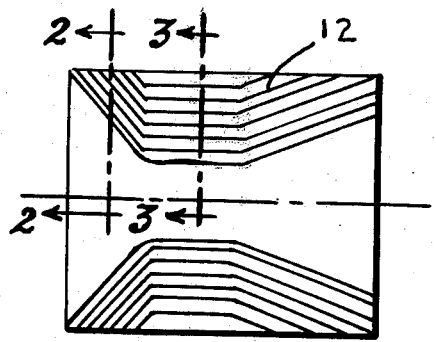
FIG. 1 represents a schematic illustration showing a side view of the fiber weaving pattern utilized in fabricating the nozzle structures of this invention.
Figure 2:
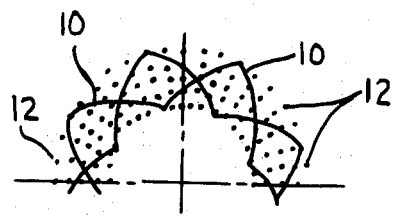
FIG. 2 represents a view of a portion of the nozzle structure shown in FIG. 1 taken along the line 2—2.
Figure 3:
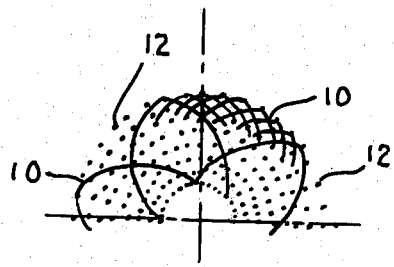
FIG. 3 represents a view of a portion of the nozzle structure shown in FIG. 1 taken along the line 3—3.

The angled interlock 3-D weave pattern, as applied to a rocket motor nozzle, is shown in FIGS. 1, 2 and 3. Most of the weaving threads 10 that fills the space between the longitudinal thread 12 have been deleted for clarity. This pattern weaves easily and maintains the alignment of the longitudinal threads in their respective radial rows so that the resulting structure has a well oriented fiber path and consistent physical properties. The curvilinear path of the wrap threads may be changed in this weave to produce desired adjustment of the conductive heat path or the hoop to radial strength ratio. Hoop wraps may also be inserted between the angled interlock wrap layer for improved hoop strength. Angled interlock has been woven in Astroquartz 300-4/4 silica fibers (Yarn Diameter 0.024 to 0.060) and carbon fibers VYB 70-½ and Polycarbon fibers having 0.015 to 0.060 yarn diameter.

Figure 4:
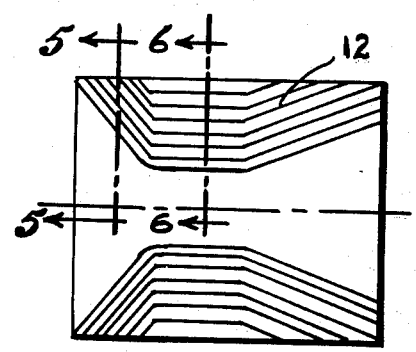
FIG. 4 represents a schematic illustration showing a side view of a different fiber weaving pattern utilized in fabricating the nozzle structures of this invention.
Figure 5:
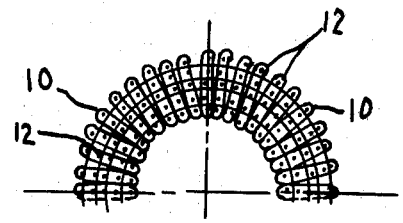
FIG. 5 represents a view of a portion of the nozzle structure shown in FIG. 4 taken along the line 5—5.
Figure 6:
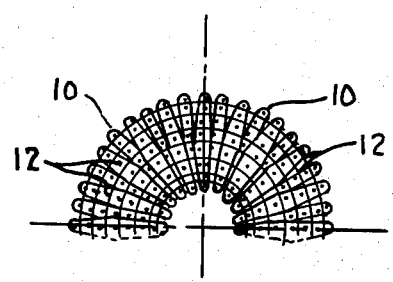
FIG. 6 represents a view of a portion of the nozzle structure shown in FIG. 4 taken along the line 6—6.

The full depth interlock 3-D weave, as applied to rocket motor nozzles, is shown in FIGS. 4, 5 and 6. This weave places the ablative material fibers 12 in the primary load path direction and, therefore, offers high strength characteristics in all directions. The large number of fibers in the radial direction provide excellent ablation characteristics. This pattern adapts very well in the transition from the nozzle area to the thrust chamber in an integrated motor assembly. It also allows for reduction of the ratio of radial 12 to circumferential fibers 10 so that a more efficient pressure vessel may be fabricated.

Other weaving patterns, such as the sawtooth pattern and the dual angled interlock pattern may also be employed. The sawtooth 3-D weave, as applied to rocket motor nozzles, is not shown. However, it is woven in right and left hand wrap patterns in order to eliminate tendencies to ablate in a spiral pattern. Additional hoop strength may be added to nozzle and thrust chambers constructed by sawtooth weave by inserting a circumferential wrap between the right and left hand layers. The relatively large number of fibers in the radial direction produce nozzles with high char retention and radial strength characteristics. Sawtooth patterns may be woven with and without circumferential wraps, depending on the desired hoop strength.

The dual angled interlock 3-D weaving, as applied to rocket motor nozzles, also is not shown. This weaving pattern is a relatively new weave that can be produced only on a fully automated loom. Dual angled interlock weaving effectively produces a cloth along the curvilinear wrap line as the weave progresses between the radial rows of longitudinal threads. As the outward spiral wrap of cloth intersects an inward spiral wrap, the cloth weaves interlock each other. The resultant interlocking cloth weave makes a superior ablator with maximum resistance to cracking and delamination.

Nozzle performance may be improved by a refinement applicable to any of the above weave patterns. Size and material of the longitudinal fibers may be varied to provide two or three integrated layers. In the two-layer system, the inside layer is made from ablative fiberous materials, such as carbon or silica, and the outer layer is high strength fibers, such as graphite or glass. The fiber in the radial elements is primarily ablative. The three integral layer construction would be similar to the two-layer construction, with a third insulation layer woven between the ablative and structural sections.

Table I, which follows, presents various characteristics of the various weave patterns referred to above.

TABLE I

| Weave Pattern | Fabricability | Impregnation and Cure | Density |
|---|---|---|---|
| Angled Interlock | Excellent | Excellent | Excellent |
| Angled Interlock - Three Integral Layers | Good | Excellent | Good |
| Full Depth Interlock | Good | Excellent | Excellent |
| Sawtooth | Good | Excellent | Good |
| Dual Angled Interlock | Good | Excellent | Excellent |

| | STRENGTH | | | |
|---|---|---|---|---|
| Weave Pattern | Radial | Hoop | Longitudinal | Ablation Performance |
| Angled Interlock | Medium | Medium | High | Good |
| Angled Interlock Three Integral Layers | High | High | High | Excellent |
| Full Depth Interlock | High | High | High | Excellent |
| Sawtooth | Medium | High | High | Excellent |
| Dual Angled Interlock | High | Medium | High | Excellent |

Each of the woven configurations described above is fabricated as follows. A collapsible mandrel, configured to the shape of a rocket nozzle thrust chamber or other propulsion component is positioned in the loom. The required number of longitudinal threads are placed in position surrounding the mandrel. The weaving thread is programmed to begin at the forward end of the mandrel and lay a continuous thread normal to the longitudinal thread and in a pattern described in FIGS. 1 through 6. Numerous weaving variations may be introduced into the weaving process to develop various types of composite structure, if desired. Integrated layers may also be weaved where the type of longitudinal thread is changed to provide more efficient placement of ablative, insulative or structural fibers where needed within the composite structure.

Similarly, layers of continuous circumferential wrap thread may be inserted between alternate layers of angled interlock or full depth interlock patterns to improve hoop strength.

During the weaving process, controlled tension is applied to the weaving thread to position the longitudinal threads against the mandrel. Throughout the entire weaving process, longitudinal threads are programmed to be removed or added as requred to maintain optimum density. The weaving thread is automatically tucked in place against the previously woven thread to assist in maintaining optimum density. The woven preform is then impregnated and cured with a thermo setting plactic, such as Monsanto Chemical Company's 1008 phenolic resin. Impregnation and curing is done in a conventional manner.

In multidimensionally woven composites, the fibers interlock with each other in three or more directions and are, therefore, held together independent of the impregnating materials. This structure eliminates chunking, delamination and fraying. It also increases strength-to-weight ratio and high temperature capability.

From a consideration of the foregoing, it can be seen that the rocket nozzle of this invention has overcome many of the problems encountered when using propulsion components suggested by the prior art. With the components of this invention, Rocket nozzles, combustion chambers and integral rocket motors may be woven in the configuration of the end item (including mounting flanges) with minimum trimming and finish machining required.

Since no supporting structure is necessary, there are no bonds and cost, weight and volume are reduced. Accurately controlled location of the reinforcing fibers results in superior strength and ablation characteristics and assures consistently high reliability. Multidimensional weaving holds the fibers together "independent of the bond". Thus, "chunking", fraying, delamination, and problems associated with the making of holes in the structures are eliminated.

Although the invention has been described with reference to particular embodiments thereof, it is to be understood by those skilled in the art that all such modifications as fall within the appended claims are intended to be included herein.

What is claimed is:

1. A multidimensional woven rocket nozzle structure comprising a nozzle body of predetermined configuration having an inlet, an outlet and a throat section therebetween, said configured body being composed of (1) fibers running generally in the direction of the longitudinal axis and positioned radially for dimensional conformance with the general shape of said configured nozzle; (2) a weaving fiber starting at one end of said configured nozzle and proceeding continuously in a direction normal to said longitudinal axis with a controlled tension in order to position said longitudinal fibers in accordance with the desired radial dimensional relationship, said weaving fiber running radially and circumferentially in a predetermined weaving pattern along the length of the longitudinal axis of said body and interlocking with said longitudinal fibers in at least three dimensions; (3) said longitudinal and said weaving fibers are composed of a material selected from the group consisting of silica, carbon, graphite and and glass fibers; and (4) a thermosetting resinous impregnant permeating the interstices of said longitudinal fibers and said weaving fiber.

* * * * *